US007944888B2

(12) United States Patent
Venkitaraman

(10) Patent No.: US 7,944,888 B2
(45) Date of Patent: May 17, 2011

(54) METHOD AND APPARATUS TO FACILITATE HANDOVER

(75) Inventor: Narayanan Venkitaraman, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 12/417,811

(22) Filed: Apr. 3, 2009

(65) Prior Publication Data

US 2009/0190556 A1    Jul. 30, 2009

Related U.S. Application Data

(62) Division of application No. 11/275,998, filed on Mar. 13, 2006, now Pat. No. 7,532,597.

(60) Provisional application No. 60/690,728, filed on Jun. 15, 2005.

(51) Int. Cl.
*H04W 4/00* (2009.01)

(52) U.S. Cl. ........ 370/331; 370/338; 370/400; 370/329; 455/456; 455/436; 455/433

(58) Field of Classification Search .......... 455/456, 455/436, 432.1, 428; 370/338, 400, 331, 370/329
See application file for complete search history.

(56) References Cited

U.S. PATENT DOCUMENTS

| 7,535,870 | B2 * | 5/2009 | Nikander et al. | 370/331 |
|---|---|---|---|---|
| 2002/0086674 | A1 * | 7/2002 | Jung | 455/436 |
| 2002/0126642 | A1 * | 9/2002 | Shitama | 370/338 |
| 2002/0172207 | A1 * | 11/2002 | Saito et al. | 370/400 |
| 2003/0086390 | A1 | 5/2003 | Eschbach et al. | |
| 2003/0087646 | A1 | 5/2003 | Funato et al. | |
| 2003/0125027 | A1 | 7/2003 | Gwon et al. | |
| 2003/0225892 | A1 | 12/2003 | Takusagawa et al. | |
| 2004/0077335 | A1 | 4/2004 | Lee et al. | |
| 2004/0246931 | A1 * | 12/2004 | Thubert et al. | 370/338 |

FOREIGN PATENT DOCUMENTS

WO    WO 2004-077747 A1    8/2004

OTHER PUBLICATIONS

Korean Examiner, "KIPO's Notice of Preliminary Rejection," Korean Intellectual Property Office, Daejeon, Republic of Korea, Oct. 29, 2009.
Lu, Jinhua and Mu, Dejun: The State Intellectual Property Office of the People's Republic of China, Beijing, China, Issuing: Jun. 23, 2010, all pages.
Blaine R. Copenheaver, "PCT/US2006/020589—PCT International Search Report and Written Opinion," WIPO, ISA/US, Commissioner for Patents, Alexandria, VA, USA, Feb. 5, 2007.
Athina Nickitas-Etienne, PCT/US2006/020589—PCT International Preliminary Report on Patentability, The International Bureau of WIPO, Geneva, Switzerland, Feb. 14, 2008.

* cited by examiner

*Primary Examiner* — David Q Nguyen

(57) ABSTRACT

A method and apparatus for handing over a mobile node from a source access point to a target access point is provided herein. During operation the source access point will create handover messages on behalf of the mobile node. When the source access point detects that handover is taking place, the source access point will transmit the appropriate handover message to the mobile node's anchor node. Because the source access point may not have the necessary security credentials to create messages on behalf of the mobile node, in an alternate embodiment of the present invention, the messages are created by the mobile node and stored at the source access point until needed.

3 Claims, 4 Drawing Sheets

100

METHOD AND APPARATUS TO FACILITATE HANDOVER

RELATED APPLICATIONS

The present invention claims priority to U.S. application Ser. No. 11/275,998, METHOD AND APPARATUS TO FACILITATE HANDOVER filed on 13 Mar. 2006, which claims priority to U.S. Provisional Application 60/690,728 filed on 15 Jun. 2005.

FIELD OF THE INVENTION

The present invention relates generally to communication networks having multiple potential points of presence for a given mobile node and more particularly to handing over of a mobile node amongst such points of presence.

BACKGROUND OF THE INVENTION

Communication networks having multiple points of presence (sometimes referred to as base stations or access points) are known. For example, multiple Layer 2 points of presence are available when a communication network has a plurality of wireless access points. As another example, multiple Layer 3 points of presence become available when a communication network has a plurality of access routers as are also known in the art.

In many cases such networks are designed to accommodate mobile nodes that change their location from time to time (including during a present communication session). As a result, a given mobile node can change its point of presence with respect to such a network. For example, a change with respect to a Layer 2 point of presence will occur when the mobile node moves between Layer 2 base stations or access points on a same Internet Protocol (IP) subnet while a change with respect to a Layer 3 point of presence (as well as with respect to a Layer 2 point of presence) will typically occur when the mobile node moves between different anchor nodes or when a mobile node moves between access points connected to different subnets As is known in the art, when an IP capable mobile node moves from one subnet to another it needs to acquire a new topologically correct address. In a system employing a mobile internet protocol (MIP), the mobile node sends its Care-of-Address (CoA) to its home agent (sometimes referred to as a home anchor node) through the target subnet to enable the home agent proxy for the mobile node and tunnel packets destined to mobile nodes home IP address to the current location, i.e. its CoA.

When moving between multiple points of presence, it is generally desired to make such a move in the least amount of time possible to ensure continuous communication between the mobile node and its anchor node or home agent. The messaging required to facilitate such a movement between subnets generally takes a longer period of time than is desired. Because of this, a need exists for a method and apparatus for handing over of a mobile node amongst such points of presence that minimizes the amount of time it takes to hand over the node.

DETAILED DESCRIPTION OF THE DRAWINGS

In order to address the above-mentioned need, a method and apparatus for handing over a mobile node from a source access point to a target access point is provided herein. During operation the source access point will create handover messages on behalf of the mobile node. When the source access point detects that handover is taking place, the source access point will transmit the appropriate handover message to the mobile node's anchor node. Because the source access point may not have the necessary security credentials to create messages on behalf of the mobile node, in an alternate embodiment of the present invention, the messages are created by the mobile node and stored at the source access point until needed.

The present invention encompasses a method for facilitating handover. The method comprises the steps of determining by a source access point that a mobile node is handing over from the source access point to a target access point, creating a message by the source access point, notifying the mobile node's anchor node of the handover, and transmitting the message to the mobile node's anchor node; causing the anchor node to route the mobile node's traffic to the target access point.

The present invention additionally encompasses a method for facilitating handover from a source access point to a target access point. The method comprises the steps of determining potential target access points, providing to a mobile node, information related to at least one of the potential target access points, and receiving a plurality of handover messages from the mobile node, wherein each handover message includes authentication code generated with a shared secret key between the mobile node and the home agent.

The present invention additionally encompasses a method for facilitating handover from a source access point to a target access point. The method comprising the steps of receiving a information about potential target access points, creating at least one handover message indicating a care of address at the target access points, wherein the handover message includes an authentication code generated with a shared secret key, and transmitting the at least one handover message to the source access point.

Figure 1:
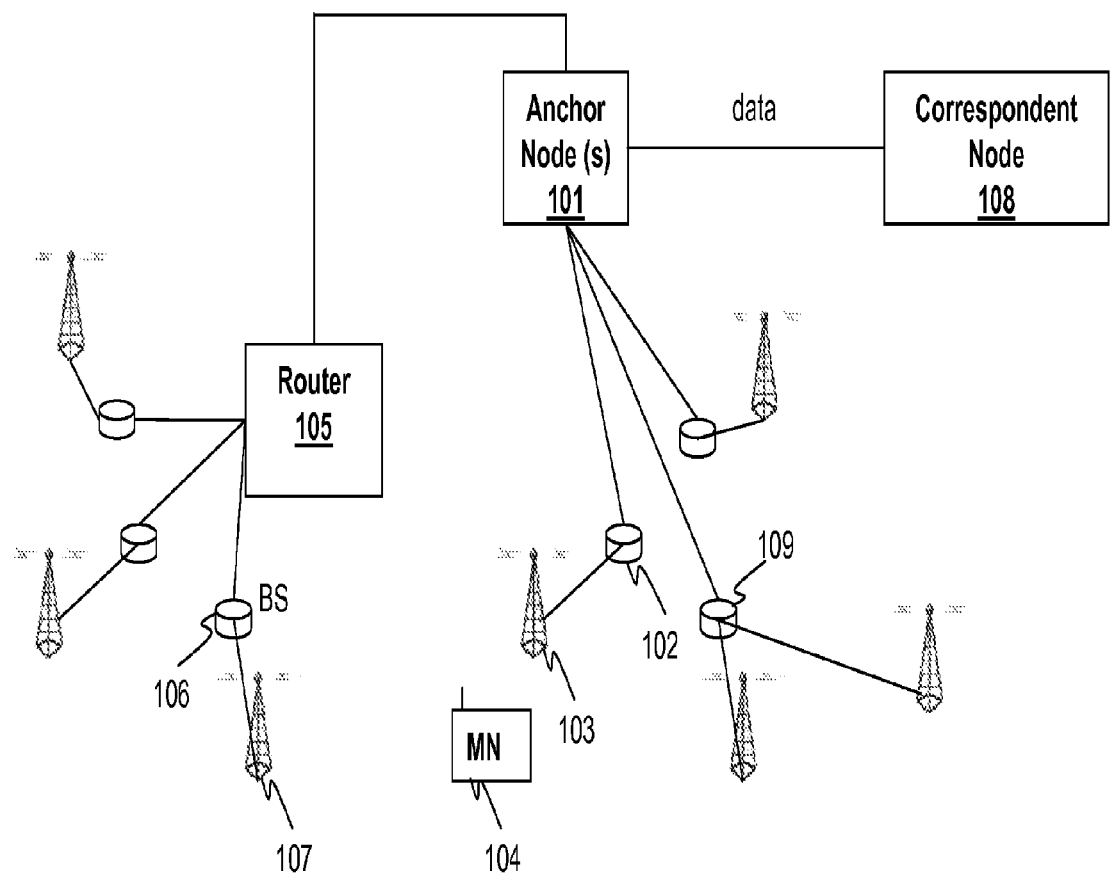
FIG. 1 is a block diagram of a communication system.

Turning now to the drawings, wherein like numerals designate like components, FIG. 1 is a block diagram of communication system 100. As shown, communication system 100 comprises mobile node (MN) 104, anchor node 101, router 105, and a plurality of access points (only access points 102, 106, and 109 are labeled). Mobile node 104 is attached to a first point-of-presence element, or access point 102 through base station 103. All base stations communicate with mobile node 104 via a wireless connection using a carrier medium and protocol of choice. For these purposes the protocol may comprise an 802.16e-family protocol but those skilled in the art will understand that essentially any communication protocol, either as presently exists or as is hereafter developed, may also serve. Additionally, while only one anchor node, router and mobile node are shown in FIG. 1, one of ordinary skill in the art will recognize that a typical communication system will have many more anchor nodes, routers, and mobile units than is shown in FIG. 1. Furthermore, although shown in FIG. 1 as separate entities, access points and base stations may be collocated.

During operation communication between mobile node 104 and anchor node 101 may utilize a security credential (such as a shared key) when transmitting control information from the mobile node to the anchor node. The use of such a key may be needed in order for the communication to be properly authenticated by the anchor node. Thus, when control information (e.g., a CoA) is sent from the mobile node to the anchor node, the control information is properly hashed with a shared key to create a message authentication code that is added to the control message.

As discussed above, in many cases network 100 may be designed to accommodate mobile nodes that change their location from time to time. As a result, a given mobile node can change its point of presence within network 100. For example, mobile node 104 may be currently communicating to correspondent node 108 utilizing an anchor node 101 through base station 103, but may be traveling in the direction of base station 107. As mobile node 104 approaches base station 107, it will need to break communication with base station 103 and continue communication with correspondent node 108 via anchor node 101 through base station 107. This will result in data being routed to the mobile node's care-of-address, taking the data through anchor node 105, access point 106, and base station 107.

As discussed, when moving between multiple points of presence, it is generally desired to make such a move in the least amount of time possible (specifically, to enable packets to be delivered to the new point of presence of the mobile node as early as possible) to ensure continuous communication between the mobile node and its anchor node or home agent and reduce the number of packets the need to be redirected from the old BS to the new BS. In order to accomplish this task, in the preferred embodiment of the present invention source base site router 102 will itself register the new care of address with the anchor node 101 on behalf of the mobile node. Once registered, anchor node 101 will forward all received data to the new care-of-address. In a first embodiment, the base station and anchor node are configured with the right credentials (security key) to communicate directly (either the BS has the MN-HA key or the BS-Anchor node share a key themselves that can be used to communicate on behalf of all MNs that may connect to BS and use the services of AN). In a second embodiment, the MN-Anchor share a key that is not available to the BS. In this case the MN creates the message and gives it to the BS ahead of time so that the BS can send it when needed, i.e. when the mobile node hands off or is about to do so.

It should be noted that devices sending data to mobile node 104 will continue to use the address of mobile node that is anchored at home agent 101. This is because for local mobility within a domain (that is typically administratively defined with access point and anchor node having a Security Association) the mobile node is completely hidden from L3 mobility even as it moves across access points belonging to different subnets. This ensures that mobile nodes with a mobile IP stack don't detect movement and start mobile IP procedures.

When moving between access points under a single anchor the source access point (e.g. base station router 102) informs the anchor node about the movement of node 104 to the target access point (e.g. base station router 109). The source access point will be made aware of the node's movement towards a new access point using well known techniques. In one embodiment this is done based on mobile node 104 periodically scanning for neighbors and reporting the received signal strength to the source (i.e., the current serving base station). If a new access points signal is better received by mobile node 104 the serving base station may decide to initiate the hand over process. As part of the process the source base station may determine (create/acquire) a new point of contact for mobile 104. This point of contact may be the IP address of the new base site, the MAC address of the new base site, or an IP address unique to the mobile in the subnet of the new base site. When the source base station determines that the mobile node is indeed handing over to the new (target) base station (for example based on the receipt of a HO-IND or the action time field in base station-HO_REQ message in the case of 802.16e), the source base station transmits a message to the anchor node indicating the new point of contact for the mobile. If the anchor node is a home agent, this message will take the form of a mobile IP registration message sent from the source base station on behalf the mobile node. In other embodiments where the anchor node is an access router or a Ethernet switch this message may take the form of IPv6 neighbor advertisement message or an ARP (Address Resolution Protocol) message.

Once made aware of the new access point/base station, the anchor node starts tunneling or forwarding packets to the new location of mobile node. The anchor node may do the redirection immediately or after a delay as specified or negotiated between the access point and the anchor node. The anchor node may also confirm the movement to the new access point by signaling the new access point to confirm that node 104 has indeed begun communication with it. After hearing from the anchor, if the new access point does not see the mobile node it will deregister the mobile node. Alternately if the new BS does not register for the mobile after a specified time out the anchor may stop forwarding packets to the new base station. Additionally, if the mobile node were to move to an access point different from the originally decided access point, then the anchor node will start forwarding packets to the new access point when it receives the current point of contact either directly from the new base station or from the source base station.

The above steps are transparent to the mobile node and can be preformed in one of two ways. In a first embodiment, as long as the access point has the right security credentials (such as a shared key) the access point will send the request to the anchor node on behalf of the mobile node without any input from the mobile node. In other words, in order to communicate on behalf of mobile node 104, base stations may need to hash all communications with the shared secret key. In another embodiment of the present invention, when the anchor node itself does not have the credentials to create the registration request on behalf of the mobile node, the mobile node creates the message that it would have transmitted to facilitate handover and provides it to the access point. This is cached in the access point. When the access point determines that mobile node is about to move to the new access point, it forwards the message to the anchor node. The anchor node can validate the message as having been sourced by the mobile node and start to redirect the packets to the new access point.

To make the above system further transparent to the mobile node, as long as the mobile node is using the same anchor node, the set of Base sites under that anchor node provide consistent mobility related information. For example the router advertisements from the base site will carry the same prefix that was assigned to the mobile node. If multiple mobile nodes with different prefixes are under a base site then the router advertisement may include all the different prefixes or the router adv may be unicast to each mobile node with the prefix being used by the mobile node. The same source address may be used by set of base sites under the same anchor node so that the mobile node does not have to change the default router. Finally a system may provide the mobile node with the same MAC address for all the base sites and enable each base site proxy for that MAC address.

As with a node moving among access points under a single anchor, a node may move to an access point under another anchor node. The source access point (base station) or source anchor node may be able to notify a higher level anchor node or the home agent of the mobile node if it has the security key. However if the source access point does not have the security key the following takes place:

When a mobile node moves, and there is a potential for anchor change, the access point provides the mobile node with a set of possible target anchors. The values in the IP Proxy Router Advertisement message defined by IETF in "Low latency handoffs for Mobile IP", as part of Fast Mobile IP protocol, may be used for this.

The mobile node then creates a binding update message (more than one if there are multiple potential targets). The binding update message is simply an update message typically sent from mobile node to the home agent that has a mapping of mobile nodes home address to care of address. As the access point does not have the security key, then the mobile node can create the hashed message (that it would have otherwise sent from the new access point) and provide it to the source access point.

When the source access point determines that the mobile node has left or the move is imminent, the source access point or the source anchor node may send the message to the home agent. Specifically, when the mobile node handoffs, the source access point or source anchor node determines if there is an anchor change. This determination, for instance, may be made by simply accessing a neighbor list that has the neighbor base sites and its preferred anchor or alternately, the base station can contact the neighbor to determine if the neighbor's preferred anchor node.

If the anchor node is sending the update, the base site will provide the anchor node will the binding update message that was created by the mobile. An access point may also pass on the message to other access points as part of context transfer so that mobile node does not have to provide the same message to each access point.

Figure 2:
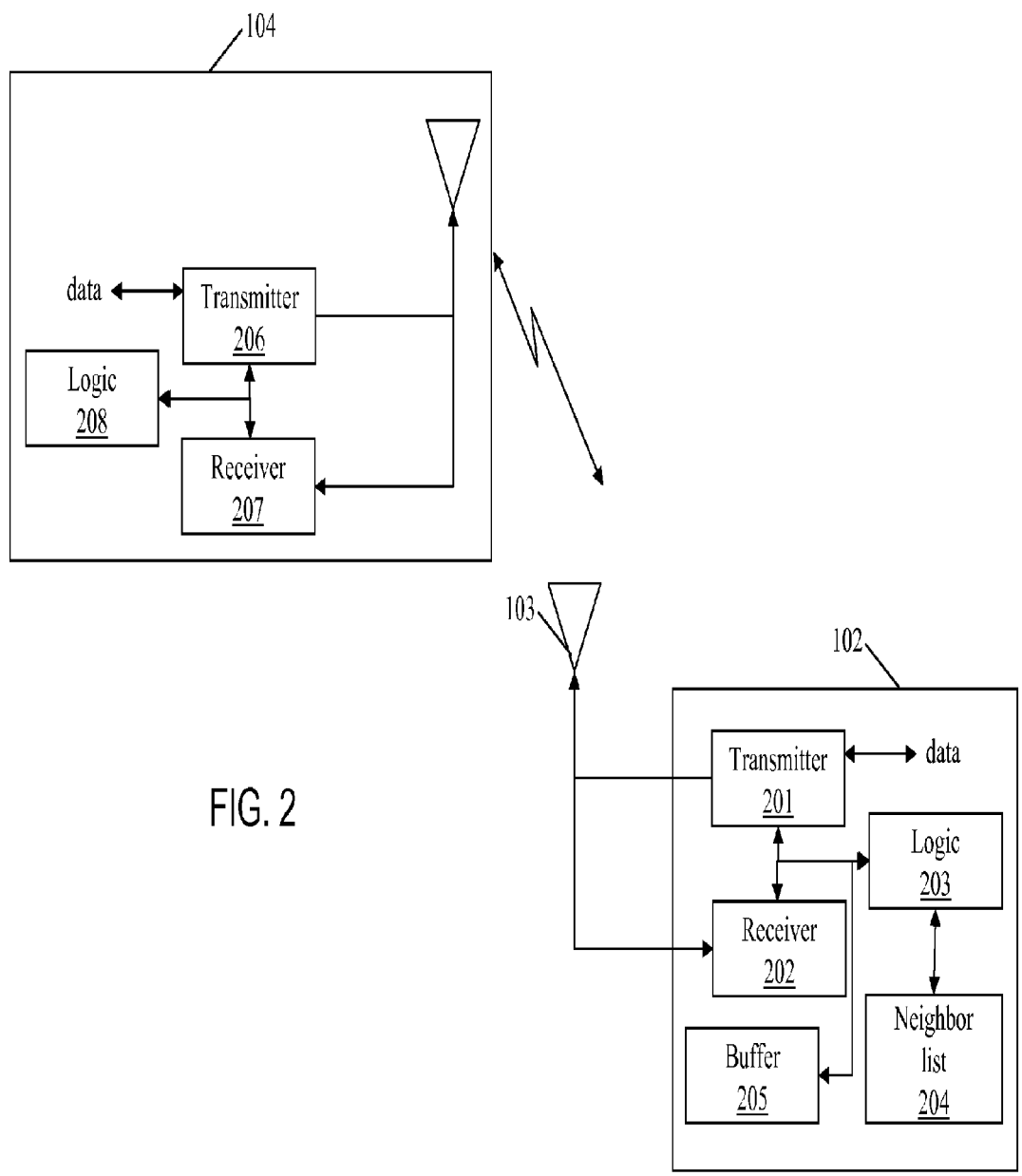
FIG. 2 is a more-detailed block diagram of a mobile node and access point.

FIG. 2 is a more-detailed block diagram of a mobile node and access point. As shown, both access point 102 and mobile node 104 contain transmit and receive circuitry 201 and 206, and 202 and 207, respectively. Logic circuitry 203 and 208 is provided as a means to control the operation of access point 102 and mobile node 104, respectively. Logic circuitry 203/208 preferably comprises a microprocessor controller, such as, but not limited to a Motorola PowerPC microprocessor. Transmit and receive circuitry 201/206 and 202/207 are common circuitry known in the art for communication utilizing a well known communication protocol, and serve as means for transmitting and receiving messages. For example, all receivers and transmitters use well-known over the air protocols such as Bluetooth, IEEE 802.11, 802.16e, or HyperLAN protocols.

Figure 3:
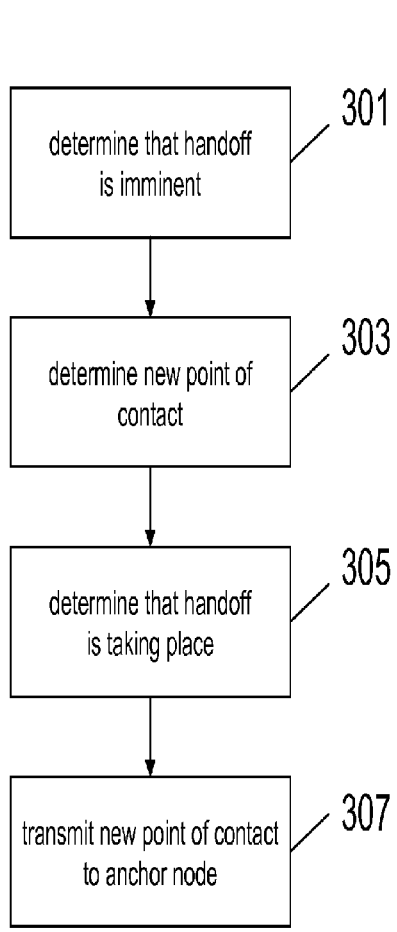
FIG. 3 is a flow chart showing the operation of an access point during node handover.

FIG. 3 is a flow chart showing the operation of access point 102 during node handover. The logic flow in FIG. 3 assumes that access point 102 has access to the security credentials required to communicate with the anchor node 101. The logic flow begins at step 301 where logic circuitry 203 determines that the handoff of node 104 is imminent. As discussed above, this determination may be from reported signal strength measurements of surrounding access points (received by receiver 202), and the determination that another access point has a better signal strength than access point 102. At step 303 a new point of contact/address is determined by logic circuitry 203. As discussed, the point of contact may be the IP address of the new base site, the MAC address of the new base site, or an IP address unique to the mobile in the subnet of the new base site. After the point of contact is determined, the logic flow continues to step 305 where the source access point determines that node 104 is handing off to the target access point. The logic flow then continues to step 307 where logic circuitry 203 instructs transmitter 201 to transmit a message to the anchor node indicating the new point of contact for the mobile. This causes the anchor node to route the mobile node's traffic to the target access point. As discussed, the message may be hashed with the shared-secret key shared between node 104 and its anchor node. This procedure is used for authenticating messages. Additionally, if the anchor node is a home agent, this message will take the form of a mobile IP registration message sent from the source access point on behalf the mobile node.

It should be noted that while the above logic flow had the handoff message being transmitted to the anchor node in anticipation of handoff, in alternate embodiments of the present invention, the source access point may wait until the mobile node has left the source access point (i.e., ceased communication with the source access point) to transmit the handoff message.

Figure 4:
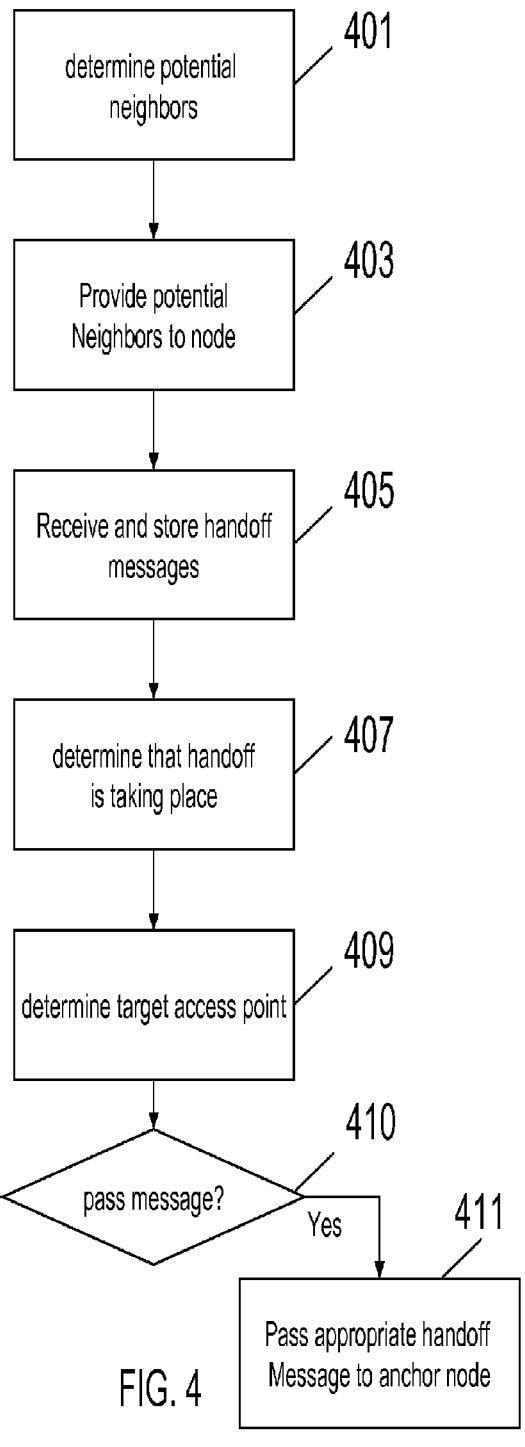
FIG. 4 is a flow chart showing the operation of an access point during node handover.

Because the point of contact is transmitted to the anchor node by serving access point 102 instead of node 104 or the target access point, the point of contact can be communicated to the anchor node in a quicker manner than in prior art systems. This helps ensure a continuous uninterrupted communication between the mobile node and its anchor node or home agent FIG. 4 is a flow chart showing the operation of access point 102 during node handover. The logic flow in FIG. 4 assumes that access point 102 does not have access to the shared secret key that node 104 utilizes in communication with its home agent. The logic flow begins at step 401 where logic circuitry 203 accesses neighbor list 204 and determines potential target anchor nodes that node 104 may utilize when roaming from access point 102. At step 403 this list is provided to node 104. In response, receiver 202 receives handoff messages for each potential candidate access point. Each handover message includes authentication code generated with a shared secret key between the mobile node and the home agent. More particularly, since access point 102 does not have the security key, node 104 must create the handover messages with the message authentication code to be provided to the home agent. These messages are received and stored in buffer 205 at step 405. The logic flow continues to step 407 where logic circuitry 203 determines that node 104 is handing off to a target access point, and determines the identity of the particular target access point (step 409). The identity of the target access point may determined by analyzing signal strength measurements reported by node 104, and assuming that node 104 is handing over to the access point with the greatest signal strength. In a IEEE 802.16e system for example, it may also be obtained by inspecting messages such as the BS_HO-REQ (Base Site Handover request, MS_HO_REQ (Mobile HO request) or the HO-IND (Handover indication) message.

The logic flow continues to step 410 where the determination as to whether the buffered message needs to be passed on to the anchor node (home agent) of the mobile node. This determination is done based on whether the mobile nodes movement would require a change in the care of address of the node there by making necessary a message to an anchor node with which only the mobile node and not the access point has a security association (e.g. the home agent of the mobile node). If such a message is required the flow continues to step 411 where buffer 205 is accessed and the appropriate handover message is provided to the anchor node. The message indicates the new care-of address and may include at least a prefix corresponding to a subnet of an anchor node serving the target access point.

As discussed, if the anchor node is a home agent, this message will take the form of a mobile IP registration message sent from the source access point on behalf the mobile node. If the movement to a neighboring access point does not involve a change in anchor node then the message is not sent to the home agent. Instead this may be optionally passed on to the target access point to which the mobile has moved. Well know context transfer schemes can be used for passing on these messages. This would enable the target access point send the message at a later time if needed without obtaining it directly from the mobile node.

Figure 5:
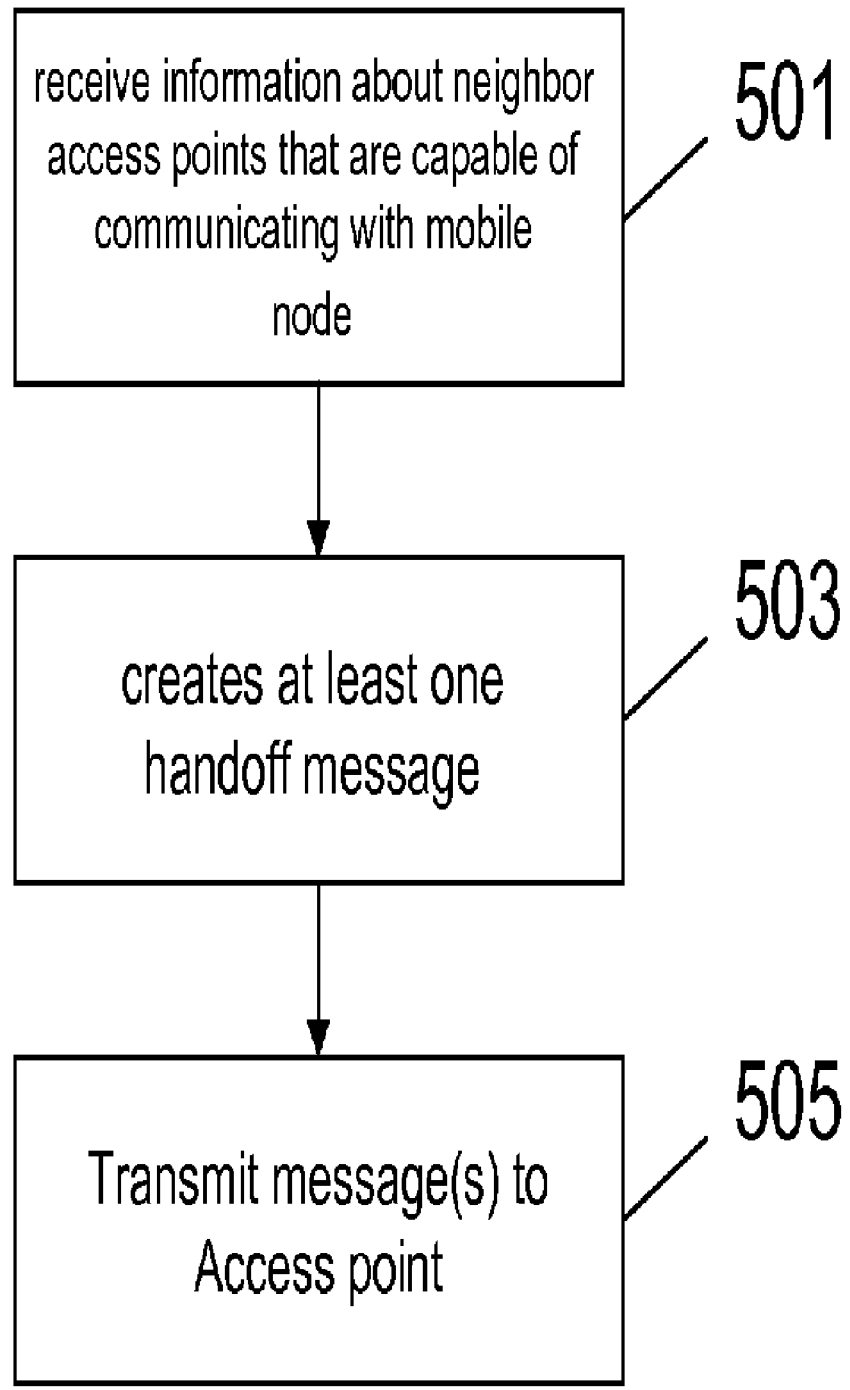
FIG. 5 is a flow chart showing operation of a mobile node.

FIG. 5 is a flow chart showing operation of mobile node 104. The logic flow in FIG. 4 assumes that access points do not have access to the security key that is used in communication between node 104 and its home agent. The logic flow begins at step 501 where receiver 207 receives information about potential target access points that are capable of communicating with mobile node 104 from a currently serving access point. At step 503 logic circuitry 208 creates at least one handoff message that includes the message authentication code created with a security key. The handoff message indicates a care-of address at the target access points and an authentication code generated with the shared secret key. As discussed, there will be a single message created corresponding to the potential care of address that may be obtained at the target base stations. Note that in some target base sites, where the same anchor can be used, a new CoA would not be needed. Further more if there are multiple potential CoAs then a message corresponding to each CoA can be created. Alternately a single message may be created. The source access point may later use the actual CoA as the source address of the IP packet, there by enabling the Home Agent (that implements NAT (Network Address Translation) travel algorithm) to use the source address as the real Care of address. At step 505 these messages are transmitted to access point 102 via transmitter 206. As discussed access point 102 will utilize these messages when it senses that node 104 is handing over to a new access point. These messages will be stored in buffer 205 until needed.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for facilitating handover from a source access point to a target access point, the method comprising the steps of:
   receiving information about potential target access points;
   creating at an access point at least one handover message indicating a care of address at the target access points, wherein the handover message includes an authentication code generated with a shared secret key; and
   transmitting the at least one handover message to the anchor node;
   wherein the handover messages will be stored at the source access point and utilized by the source access point to facilitate handover from the source access point to the target access point.

2. The method of claim 1 wherein the access point comprises a source access point.

3. The method of claim 1 wherein the access point comprises a target access point.

* * * * *